(12) United States Patent
Tanabe et al.

(10) Patent No.: US 7,637,990 B2
(45) Date of Patent: Dec. 29, 2009

(54) AIR VENT APPARATUS FOR WATER TUBE

(75) Inventors: Hiroshi Tanabe, Takasago (JP);
Yasuhiro Hashimoto, Takasago (JP)

(73) Assignee: Mitsubishi Heavy Industries, Tokyo (JP)

( * ) Notice: Subject to any disclaimer, the term of this patent is extended or adjusted under 35 U.S.C. 154(b) by 581 days.

(21) Appl. No.: 11/341,439

(22) Filed: Jan. 30, 2006

(65) Prior Publication Data
US 2006/0225784 A1 Oct. 12, 2006

(30) Foreign Application Priority Data
Mar. 23, 2005 (JP) ............................. 2005-083026

(51) Int. Cl.
B01D 19/00 (2006.01)
(52) U.S. Cl. .............................. 96/157; 95/260; 96/194; 96/204; 137/197; 137/207
(58) Field of Classification Search .................. 95/260; 96/157, 194, 204; 137/197, 207
See application file for complete search history.

(56) References Cited

U.S. PATENT DOCUMENTS 7,018,472 B2 * 3/2006 Yamauchi ................... 118/300

2006/0137663 A1 * 6/2006 Vaught ........................ 123/516

FOREIGN PATENT DOCUMENTS

| DE | 1 450 626 | A | | 6/1969 |
|----|-----------|---|---|--------|
| DE | 97 733 | A | | 5/1973 |
| FR | 2721989 | A1 | | 1/1996 |
| FR | 2721989 | A1 | * | 1/1996 |
| GB | 2117662 | A | * | 10/1983 |
| JP | 01215311 | A | * | 8/1989 |
| JP | 10-227581 | | | 8/1998 |
| JP | 10-227581 | A | | 8/1998 |

OTHER PUBLICATIONS

Chinese Office Action dated Oct. 19, 2007, Application No. 2006100064935.
Office Action dated Mar. 10, 2009 in Corresponding German Patent Application No. 10 2006 004 615.3-24.

* cited by examiner

*Primary Examiner*—Duane Smith
*Assistant Examiner*—Douglas J Theisen
(74) *Attorney, Agent, or Firm*—Westerman, Hattori, Daniels & Adrian, LLP

(57) ABSTRACT

An air vent apparatus for a water tube, comprising:
an air separator pipe installed to have an axial direction along a vertical direction, and connected to a portion, where an air reservoir tends to occur, of the water tube for passage of water; and
air vent means for venting air accumulating in the air separator pipe.

3 Claims, 3 Drawing Sheets

AIR VENT APPARATUS FOR WATER TUBE

BACKGROUND OF THE INVENTION

1. Field of the Invention

This invention relates to an air vent apparatus for a water tube. More specifically, the invention relates to an air vent apparatus for a water tube, which is designed to be capable of preventing the occurrence of a water reservoir in the water tube by conveniently and easily venting air liberated in the water tube.

2. Description of the Related Art

In a thermal power plant, a nuclear power plant, and a combined power plant, seawater is often used as cooling water (circulating water) for use in a condenser.

As shown in FIG. 2, circulating water (seawater) is drawn from a water intake pit (sea) 2 by a circulating water pump 1, and the drawn circulating water (seawater) is fed to a condenser 4 via a circulating water tube 3a located on a water supply side. In the condenser 4, an exhaust gas sent from a steam turbine is cooled with the use of the circulating water (seawater) to cool steam in the exhaust gas for condensation. The circulating water (seawater), which has increased in temperature upon use in cooling, is released into a water release pit (sea) 5 through a circulating water tube 3b located on a water release side.

A shellfish removing device 6 is interposed in the circulating water tube 3a on the water supply side, while a condenser cleaning device 7 and a flow control valve 8 are interposed in the circulating water tube 3b on the water release side.

Iron is used as a tubular material for the circulating water tubes 3a, 3b, and a lining material such as a rubber material is applied to the inner peripheral surface of each of these tubes, for example, by coating. The provision of such a lining material prevents the corrosion of the circulating water tubes 3a, 3b by circulating water (seawater).

To prevent the deposition of shellfishes, etc. on the inner peripheral surfaces of the circulating water tubes 3a, 3b, moreover, the flow velocity of circulating water (seawater) flowing in the circulating water tubes 3a, 3b is set, for example, at a predetermined velocity of the order of 3 to 4 m/second.

Rendering the flow velocity lower than this predetermined velocity poses the problem of deposition of shellfishes on the inner peripheral surfaces of the circulating water tubes 3a, 3b, thereby decreasing the channel areas of these tubes or clogging these tubes. The flow velocity in excess of the predetermined velocity, reaching 5 m/second or higher, for example, causes the problem of peeling off the lining material coated on the inner peripheral surfaces of the circulating water tubes 3a, 3b.

Thus, the flow velocity of circulating water (seawater) flowed in the circulating water tubes 3a, 3b is adjusted to the predetermined velocity (for example, 3 to 4 m/second).

The circulating water (seawater) utilized in cooling (heat exchange) in the condenser 4 has an increased temperature, and is thus in a state where air dissolved in seawater tends to be liberated. At a negative pressure, in particular, air tends to become liberated from seawater.

Air liberated from the seawater accumulates in the water box of the condenser 4. If the amount of the accumulating air increases beyond a certain level, the performance of the condenser 4 declines. Thus, the condenser 4 has hitherto been equipped with an air vent apparatus. If the amount of air accumulating in the water box reaches a certain value or higher, this accumulating air is discharged to the outside by the air vent apparatus (see Japanese Patent Application Laid-Open No. 1998-227581).

In the circulating water tube 3b on the water release side, circulating water (seawater), which is flowing, increases in temperature, making it easy to liberate air dissolved in seawater. If there are ups and downs in the piping route of the circulating water tube 3b on the water release side, the internal pressure of the circulating water tube 3b may become negative because of the hydraulic gradient. In the circulating water tube 3b on the water release side under such circumstances, air may be liberated from seawater to generate an air reservoir, in a negative pressure zone where the internal pressure becomes negative.

As shown in FIG. 3, for example, the height of the circulating water tube 3b disposed may be once raised, and then lowered, along the flowing direction of water (i.e., α-direction in FIG. 3). In this case, an air reservoir A may occur in a portion where the height of the circulating water tube 3b begins to be lowered (i.e., β portion in FIG. 3).

If such an air reservoir A occurs, the channel area for the circulating water decreases by the amount corresponding to the air reservoir A. As a result, the flow velocity of circulating water at this site increases, thereby causing a possibility for the peeling of the lining, or presenting the problem of an increased pressure loss.

Thus, there has been need for a piping plan according to which no air reservoir is formed halfway through the circulating water tube 3b.

If there are ups and downs in the circulating water tube 3b, moreover, it has been necessary to check the hydraulic gradient, thereby making sure that the interior of the tube is not at a negative pressure, and work out a contrivance for avoiding a negative pressure.

An example of the contrivance for avoiding a negative pressure is that, as shown in FIG. 2, the flow control valve 8 is provided in a portion, as downstream as possible, of the circulating water tube 3b on the water release side, and its valve opening is properly adjusted, whereby the pressure of the entire channel of the circulating water tubes 3a, 3b is brought to a positive pressure so that no negative pressure occurs throughout the watercourse of the circulating water tubes 3a, 3b.

Earlier technologies involve the following problems:

(1) Particularly when equipment is designed under a scrap-and-build approach, the ground area is often limited, so that there may be restrictions on the layout because of the effective use of or interference by existing equipment. In this case, planning of a piping route free from the formation of an air reservoir may be difficult.

(2) It is necessary to check a hydraulic gradient in view of a piping plan, and reflect the results of checks in the piping plan. Thus, planning and designing require time and labor.

(3) The flow control valve 8 for ensuring a pressure is installed in the circulating water tube 3b on the water release side and, accordingly, the necessity for raising the pump head of the circulating water pump 1 may arise. In detail, if it is attempted to render the pressure of the entire watercourse of the circulating water tubes 3a, 3b a positive pressure by providing the flow control valve 8 and appropriately adjusting its valve opening, the fluid resistance of the flow control valve 8 increases. To flow an appropriate amount of circulating water, therefore, there arises the need to raise the pump head of the circulating water pump 1.

(4) If the air reservoir A occurs in the circulating water tube 3b as shown in FIG. 3, the channel area for circulating water decreases by the amount corresponding to the air reservoir A. As a result, the flow velocity of circulating water at this site increases, thereby causing a possibility for the peeling of the lining, or presenting the problem of an increased pressure loss.

The present invention has been accomplished in light of the above-described problems with the earlier technologies. It is an object of the invention to provide an air vent apparatus which can vent air from a portion of a water tube, such as a circulating water tube, where an air reservoir tends to occur.

SUMMARY OF THE INVENTION

An aspect of the present invention is an air vent apparatus for a water tube, comprising:

an air separator pipe installed to have an axial direction along a vertical direction, and connected to a portion, where an air reservoir tends to occur, of the water tube for passage of water; and air vent means for venting air accumulating in the air separator pipe.

Another aspect of the present invention is an air vent apparatus for a water tube, comprising:

an air separator pipe installed to have an axial direction along a vertical direction, and connected to a portion, where an air reservoir tends to occur, of the water tube for passage of water;

an air vent pump capable of venting air accumulating in the air separator pipe;

air amount detection means for detecting an air amount of the air accumulating in the air separator pipe; and control means for actuating the air vent pump when the air amount detected by the air amount detection means exceeds a set air amount which has been set beforehand, and for stopping the air vent pump when the air amount detected by the air amount detection means decreases to not more than the set air amount which has been set beforehand.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

An embodiment of the present invention will be described in detail with reference to the accompanying drawings.

EMBODIMENT

Figure 1:
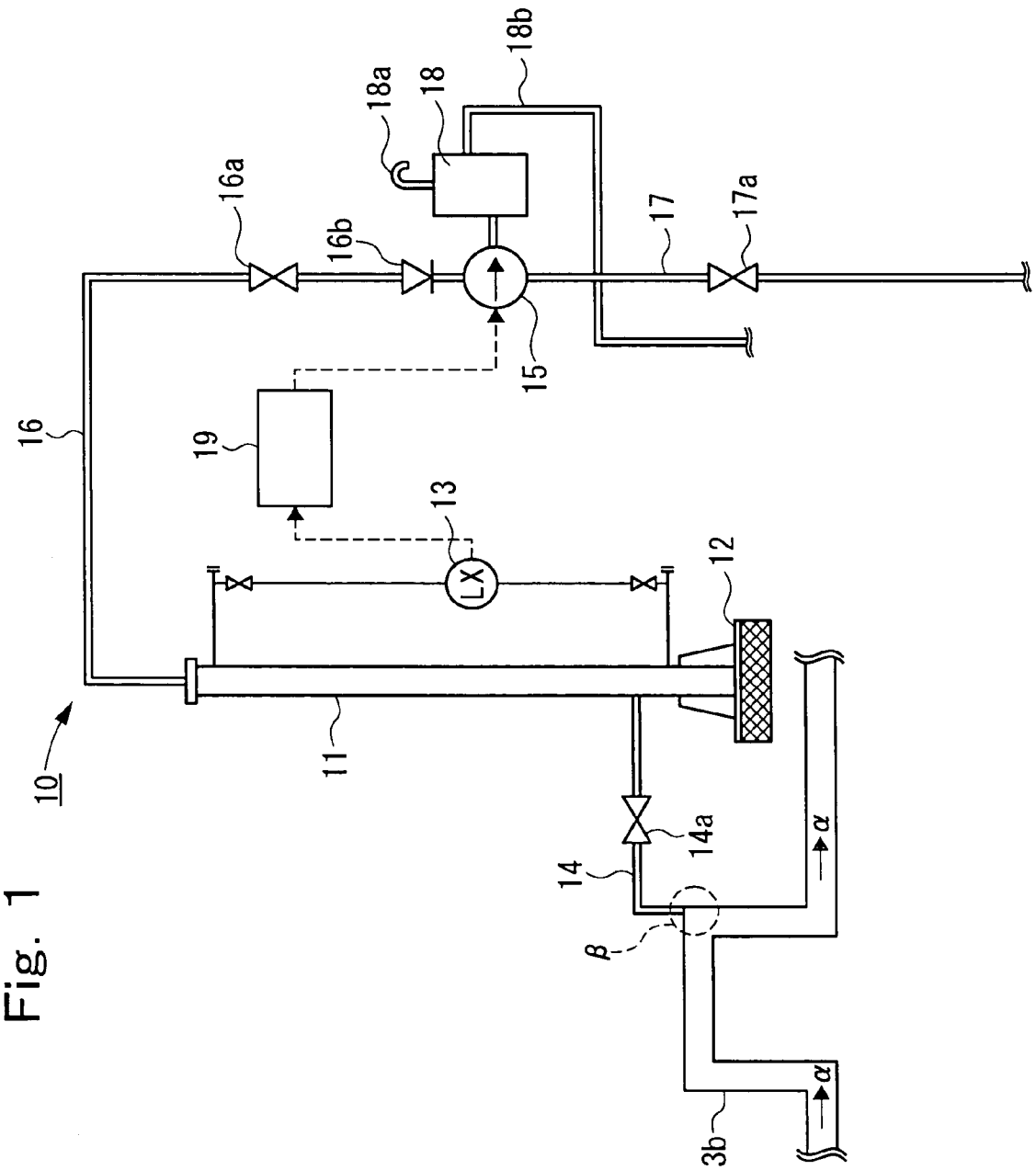
FIG. 1 is a configurational drawing showing an air vent apparatus for a water tube according to an embodiment of the present invention.
Figure 2:
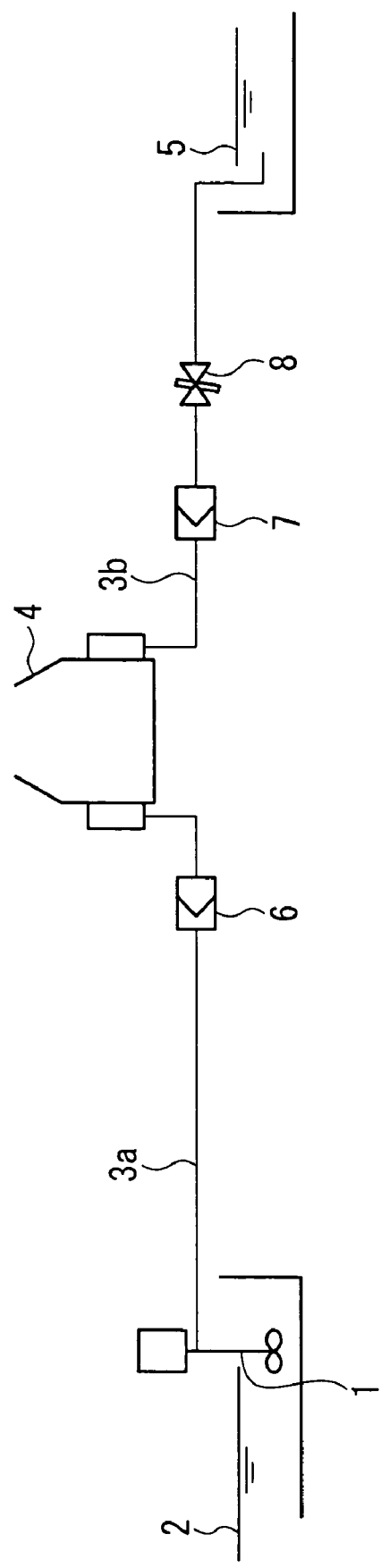
FIG. 2 is a configurational drawing showing a cooling water system of a condenser.
Figure 3:
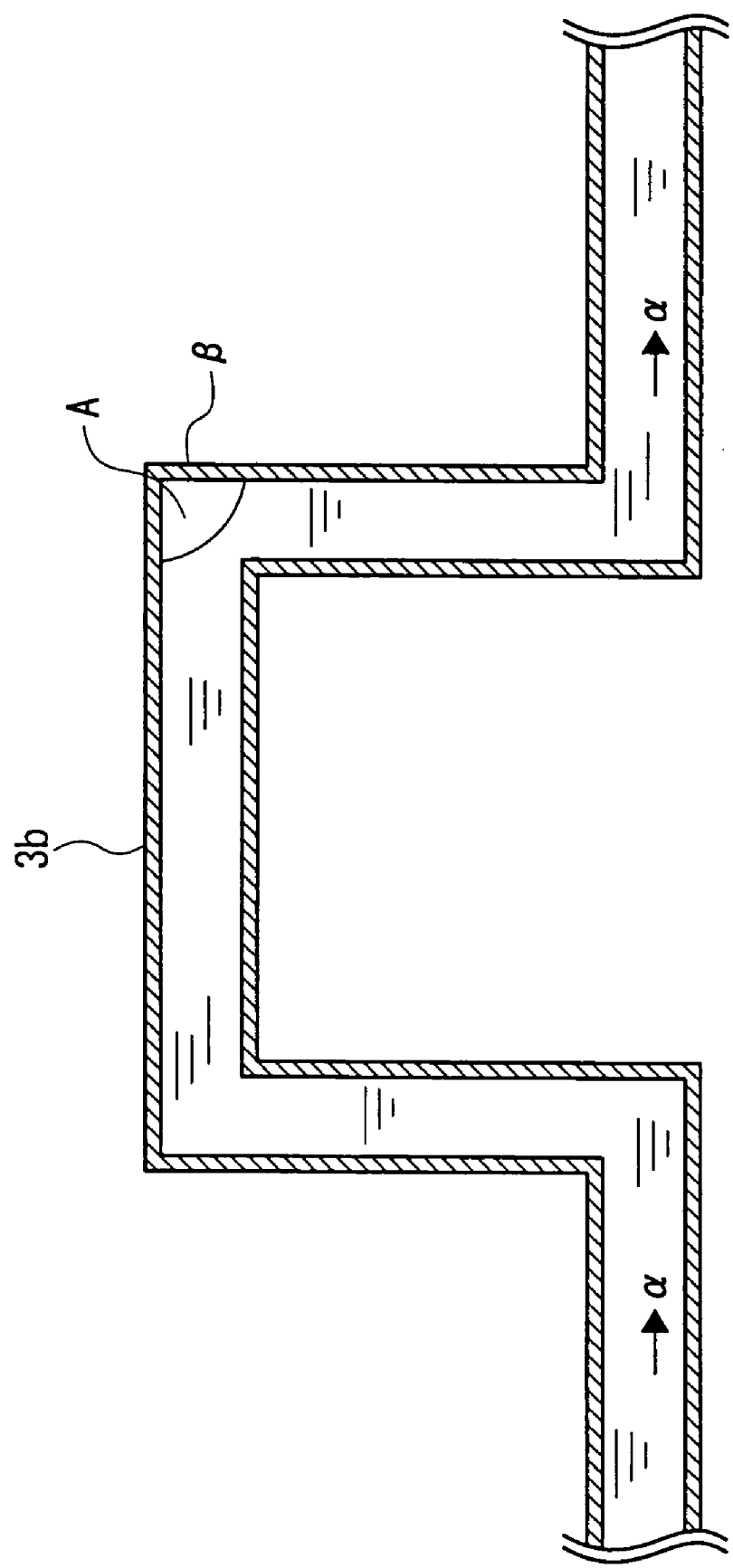
FIG. 3 is an explanation drawing showing the state of occurrence of an air reservoir.

FIG. 1 shows an air vent apparatus 10 according to an embodiment of the present invention. An air separator pipe 11 of the air vent apparatus 10 is installed on the ground 12 so as to have an axial direction along a vertical direction. In the present embodiment, the length of the air separator pipe 11 is 6 m. The air separator pipe 11 is equipped with a water level detector 13 for detecting the water level of seawater which has flowed into the air separator pipe 11.

A lower portion of the air separator pipe 11 is connected by a connecting piping 14 to a circulating water tube 3b located on a water release side. In more detail, the connecting piping 14 is connected to a portion of the circulating water tube 3b where an air reservoir tends to occur.

For example, if the height of the circulating water tube 3b disposed is once raised, and then lowered, along the flowing direction of water (i.e., α-direction in FIG. 1), an air reservoir tends to occur in a portion where the height of the circulating water tube 3b begins to be lowered (i.e., β portion in FIG. 1). Thus, the connecting piping 14 is connected to this portion where the height of the circulating water tube 3b begins to be lowered.

An opening and closing valve 14a is interposed in the connecting piping 14.

If the height of the circulating water tube 3b disposed is raised by 1 to 2 m or more, and then lowered, for example, an air reservoir tends to occur at this portion where lowering begins.

An air vent pump 15 is connected to the top of the air separator pipe 11 via an air vent piping 16. An opening and closing valve 16a and a non-return valve 16b are interposed in the air vent piping 16.

The air vent pump 15 is supplied with house water, as sealing water, via a sealing water piping 17. An opening and closing valve 17a is interposed in the sealing water piping 17.

A separator 18 is connected to the discharge side of the air vent pump 15. The separator 18 separates water and air sent from the air vent pump 15, discharges the separated air through an air discharge piping 18a, and discharges the separated water through a sealing water discharge piping 18b.

A water signal, which indicates the water level within the air separator pipe 11 detected by the water level detector 13, is transmitted to a control device 19. The control device 19 determines the amount of air, accumulated in the air separator pipe 11, based on the water level signal.

When the control device 19 detects that the determined amount of air (the amount of air accumulated in the air separator pipe 11) has exceeded a set air amount which has been set beforehand, the control device 19 actuates the air vent pump 15. When the control device 19 detects that the determined amount of air (the amount of air accumulated in the air separator pipe 11) has decreased to the set air amount which has been set beforehand, the control device 19 stops the air vent pump 15.

When the air vent apparatus 10 is operated, the opening and closing valves 14a, 16a, 17a are in an open state. When circulating water (seawater) is flowed through the circulating water tube 3b in this state, this circulating water passes through the connecting piping 14 and flows into the air separator pipe 11 as well.

When the circulating water (seawater) at an increased temperature flows in the circulating water tube 3b, air may be liberated at the β portion (the portion prone to a negative pressure) of the circulating water tube 3b. The liberated air passes through the connecting piping 14, enters the air separator pipe 11, and accumulates in the air separator pipe 11. At this time, the air vent pump 15 is at rest.

The control device 19 actuates the air vent pump 15 when detecting that the amount of air (the amount of air accumulated in the air separator pipe 11) determined based on the water level signal transmitted from the water level detector 13 has exceeded the set air amount which has been set beforehand.

Upon actuation of the air vent pump 15, air inside the air separator pipe 11 is passed through the air vent piping 16, sucked by the air vent pump 15, separated by the separator 18, and discharged through the air vent piping 18a.

At this time, sealing of the air vent pump 15 is performed by sealing water sucked through the sealing water piping 17, and this sealing water is separated by the separator 18, and discharged through the sealing water discharge piping 18b.

In this manner, air is vented from within the air separator pipe 11. When, at this time, the control device 19 detects that the amount of air (the amount of air accumulated in the air separator pipe 11) determined based on the water level signal transmitted from the water level detector 13 has decreased to not more than the set air amount which has been set beforehand, it stops the air vent pump 15.

The actions for actuating and stopping the air vent pump 15 are controlled by the control device 19 as described above. Thus, the amount of air within the air separator pipe 11 can be rendered the set air amount or less. As a result, air can be vented from the portion of the circulating water tube 3b, where air is prone to liberation and an air reservoir tends to occur (concretely, the β portion in FIG. 1), by means of the air vent apparatus 10, so that the occurrence of the air reservoir within the circulating water tube 3b can be prevented.

Thus, peeling of lining and the increase of a pressure loss, due to the air reservoir, can be prevented.

By installing the air vent apparatus 10 as described above, the occurrence of an air reservoir can be prevented, even if there are restrictions on the layout and ups and downs in the circulating water tube 3b.

In other words, where the circulating water tube 3b should be disposed in the piping layout can be decided beforehand without considerations of the pressure gradient. If the air vent apparatus 10 is installed after deciding on the piping layout, the occurrence of an air reservoir can be prevented.

In the embodiment shown in FIG. 1, the amount of air in the air separator pipe 11 is detected by the water level detector 13, and the actuation and stoppage of the air vent pump 15 are controlled by the control device 19 in accordance with the detected amount of air. If the top of the air separator pipe 11 is located at a position 10 m or more higher than the highest position of the circulating water tube 3b in the piping layout, the air vent pump 15 can be operated continuously.

This is because circulating water, which has flowed into the air separator pipe 11, cannot ascend beyond 10 m with respect to the highest position of the circulating water tube 3b in the piping layout.

The present invention can be applied not only to the above-mentioned circulating water tube on the water release side for release of water from the condenser, but also to various types of water tubes which are required to prevent the occurrence of an air reservoir in the tubes during passage of water therethrough.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An air vent apparatus for a water tube, comprising:
   an air separator pipe installed to have an axial direction along a vertical direction, and connected to a portion, where an air reservoir tends to occur, of the water tube for passage of water;
   an air vent pump capable of venting air accumulating in the air separator pipe;
   air amount detection means for detecting an air amount of the air accumulating in the air separator pipe; and
   control means for actuating the air vent pump when the air amount detected by the air amount detection means exceeds a set air amount which has been set beforehand, and for stopping the air vent pump when the air amount detected by the air amount detection means decreases to not more than the set air amount which has been set beforehand.

2. The air vent apparatus for a water tube according to claim 1, wherein
   the water tube is a circulating water tube on a water release side for releasing seawater, which has been discharged from a condenser, into a sea.

3. An air vent apparatus for a water tube, comprising:
   an air separator pipe installed to have and axial direction along a vertical direction, and connected to a portion, where an air reservoir tends to occur, of the water tube for passage of water; and
   an air vent means for venting air accumulating in the air separator pipe,
   wherein when a height of the water tube disposed is once raised, and then lowered, along a flowing direction of water, the air separator pipe is connected to a portion of the water tube where the height of the water tube begins to be lowered,
   wherein the water tube includes a raised portion where the height of the water tube is raised and a lowered portion where the height of the water tube begins to be lowered, and
   wherein the water tube includes a substantially straight and horizontal tube portion between the raised portion and the lowered portion.

* * * * *